United States Patent
Al-Alusi et al.

(10) Patent No.: US 9,561,855 B2
(45) Date of Patent: Feb. 7, 2017

(54) ALTERNATE DIRECTIONAL MOMENTUM VENTILATION NOZZLE FOR PASSENGER CABINS

(75) Inventors: Thamir R. Al-Alusi, Mukilteo, WA (US); Julia W. Miller, Lake Stevens, WA (US)

(73) Assignee: THE BOEING COMPANY, Chicago, IL (US)

( * ) Notice: Subject to any disclaimer, the term of this patent is extended or adjusted under 35 U.S.C. 154(b) by 2040 days.

(21) Appl. No.: 12/113,450

(22) Filed: May 1, 2008

(65) Prior Publication Data

US 2009/0275277 A1  Nov. 5, 2009

(51) Int. Cl.
*B64D 13/00* (2006.01)
*B60H 1/34* (2006.01)
*B60H 1/00* (2006.01)
*F24F 13/06* (2006.01)
*F24F 13/14* (2006.01)

(52) U.S. Cl.
CPC ............ *B64D 13/00* (2013.01); *B60H 1/00371* (2013.01); *B60H 1/34* (2013.01); *F24F 13/06* (2013.01); *B64D 2013/003* (2013.01); *F24F 13/14* (2013.01)

(58) Field of Classification Search
CPC .......... F24F 13/072; F24F 13/06; F24F 13/14; B60H 1/00371; B60H 1/34; B64D 13/00
USPC ... 454/71, 76, 188, 185, 305, 292, 299, 301, 454/153, 154, 190, 191, 137, 284, 155, 454/75
See application file for complete search history.

(56) References Cited

U.S. PATENT DOCUMENTS

| 3,877,356 | A | * | 4/1975 | Bruns ........................... 454/299 |
| 4,556,172 | A | | 12/1985 | Sugawara et al. |
| 4,679,495 | A | * | 7/1987 | Locker .................... F24F 13/06 454/284 |
| 4,819,548 | A | | 4/1989 | Horstman |
| 5,388,744 | A | * | 2/1995 | Glorio et al. ................. 224/324 |
| 6,413,159 | B1 | | 7/2002 | Bates, III et al. |
| 7,121,100 | B2 | | 10/2006 | Atkey et al. |
| 2004/0089007 | A1 | * | 5/2004 | Umebayashi et al. .......... 62/244 |
| 2005/0230488 | A1 | | 10/2005 | Markwart et al. |
| 2007/0111650 | A1 | | 5/2007 | Lerche |
| 2007/0144729 | A1 | | 6/2007 | Beier et al. |
| 2008/0053126 | A1 | | 3/2008 | Ebigt et al. |

FOREIGN PATENT DOCUMENTS

DE   1679564 A1 *  3/1972  .............. F24F 13/06

* cited by examiner

*Primary Examiner* — Helena Kosanovic
(74) *Attorney, Agent, or Firm* — Armstrong Teasdale LLP

(57) ABSTRACT

A ventilation nozzle assembly is described that includes a first air outlet channel configured to provide an air flow in a first direction, a second air outlet channel adjacent the first air outlet channel configured to provide an air flow in a second direction, a third air outlet channel adjacent the second air outlet channel and configured to provide an air flow in a third direction, and a fourth air outlet channel adjacent the third air outlet channel and configured to provide an air flow in a fourth directions. An air flow from the third air outlet channel is configured reduce an impact of the air flow from the fourth air outlet channel has on the air flows from the first air outlet channel and the second air outlet channel.

15 Claims, 5 Drawing Sheets

ALTERNATE DIRECTIONAL MOMENTUM VENTILATION NOZZLE FOR PASSENGER CABINS

BACKGROUND OF THE INVENTION

The field of the invention relates generally to passenger comfort within aircraft cabins, and more specifically, to an alternate directional momentum ventilation nozzle for passenger cabins.

A problem exists when attempting to provide conditioned air in the passenger cabins of aircraft to meet the thermal comfort needs of the passenger cabin occupants. The seated passengers' thermal comfort is dependent on the air supply nozzle to satisfy the following conditions at the passenger head level: a lower air velocity (no air draft), a reduced temperature stratification across the passenger cabin, and an adequate ventilation effectiveness. However, in the aisles, it is necessary to have a relatively higher air flow at the standing occupant head level to satisfy the flight attendants' thermal comfort.

Satisfying the thermal comfort for all occupants within an aircraft cabin is a challenge due to the required high air flow volume into the enclosed and limited volume of the passenger cabin. Additionally, the interior design requirement is to keep the air distribution nozzle outlets as small as possible. This requirement necessitates higher air flow velocity at the nozzle outlet to deliver the required conditioned volumetric air flow. Diffusing the nozzle air jet speed before the air reaches the cabin occupants is another challenge.

Currently most passenger airplanes use air supply nozzles in the passenger cabins with two-dimensional air flow at the nozzle's outlet. Additionally, most of these nozzles have large outlet areas. These two dimensional air flow nozzles have the same air flow distribution pattern at any section along the passengers' cabin. Nozzles with two-dimensional air flow have an outlet air flow in one direction which cannot be diffused rapidly before reaching the passengers and results in a high air draft with low air temperature at the center seats of the cabin, high temperature stratification across the cabin, and a lower air velocity in the aisles, all of which contribute in a reduced passenger thermal comfort.

Adding to the challenges described above, additional features added to current passenger aircraft contribute to increasing electrical heat dissipation within the passengers' cabin. To counteract this increase in heat, additional cooling is required which can only be achieved by providing a cooler air supply and/or a higher volumetric flow. The existing nozzle designs with two-dimensional outlet air flow can not satisfy the passengers' thermal comfort with the additional demands for a cooler air supply and/or a higher volumetric air flow.

BRIEF DESCRIPTION OF THE INVENTION

In one aspect, a ventilation nozzle assembly is provided that includes a first air outlet channel configured to provide an air flow in a first direction, a second air outlet channel adjacent the first air outlet channel and configured to provide an air flow in a second direction, a third air outlet channel adjacent the second air outlet channel and configured to provide an air flow in a third direction, and a fourth air outlet channel adjacent the third air outlet channel and configured to provide an air flow in a fourth direction. An air flow from the third air outlet channel is configured reduce an impact of the air flow from the fourth air outlet channel has on the air flows from the first air outlet channel and the second air outlet channel.

In another aspect, a ventilation nozzle is provided that includes at least three air outlet channels. One of the air outlet channels has an axial and vertical orientation such that an air flow therefrom operates to reduce an influence the air flows from the other air flow channels have on one another.

In still another aspect, a method for providing a diffused air flow in a passenger cabin of a passenger vehicle to control an overall temperature stratification within the cabin is provided. The method includes providing a first air flow in a first direction, providing a second air flow in a second direction, the first direction and the second direction different in both an axial and a vertical direction with respect to a vehicle centerline, and providing a third air flow in a direction such that the third air flow operates to reduce the impact that the first air flow has on the second air flow thereby diffusing an overall air flow with respect to a seating area of a passenger vehicle.

DETAILED DESCRIPTION OF THE INVENTION

The embodiments described herein relate to an air flow nozzle configuration that consists of multiple channels aligned along the sides of the passenger cabin with variable orientations, in both the vertical direction and in the axial direction, that provides an air supply into the passenger cabin of an aircraft to provide a satisfying thermal comfort level to aircraft passengers and personnel regardless of their position within the cabin.

Figure 1:
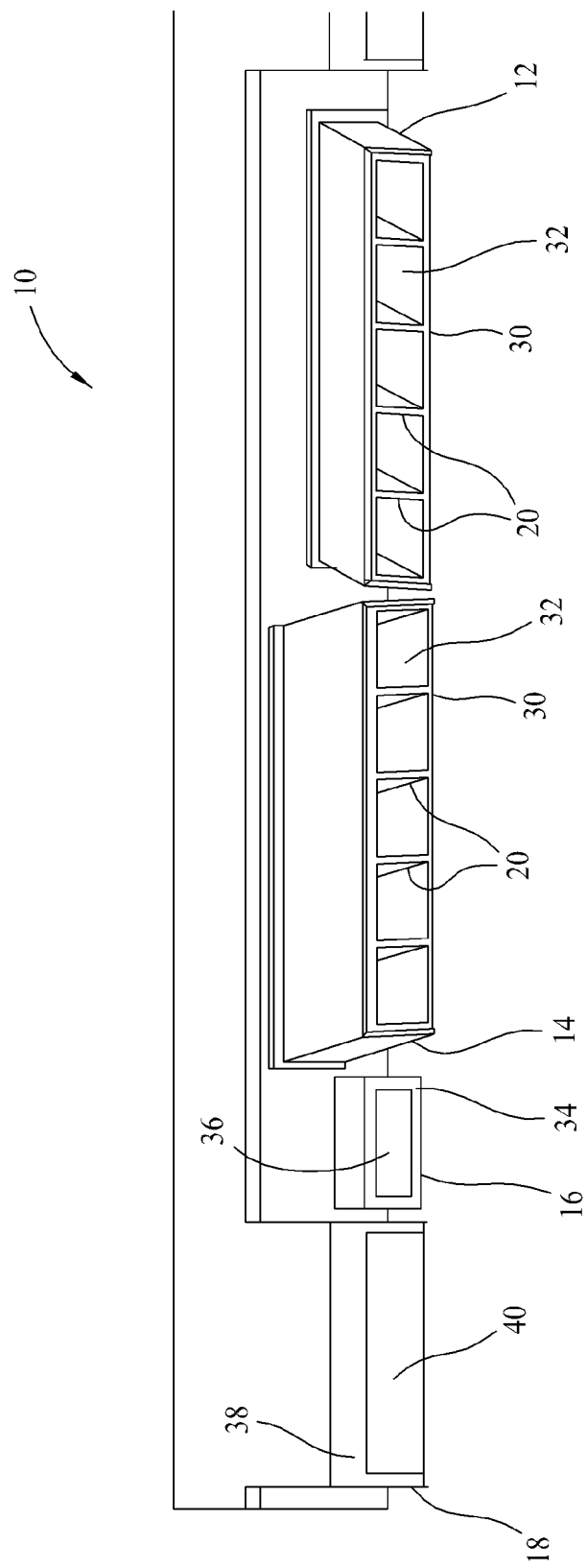
FIG. 1 is a schematic diagram of a multiple air outlet ventilation nozzle.

FIG. 1 is a schematic diagram of a multiple air outlet ventilation nozzle 10. Ventilation nozzle 10 includes a first air outlet channel 12 configured to provide an air flow in a first direction, a second air outlet channel 14 configured to provide an air flow in a second direction, a third air outlet channel 16 configured to provide an air flow in a third direction, and a fourth air outlet channel 18 configured to provide an air flow in a fourth direction. In operation, the air flow from the third air outlet channel 16 operates as a buffer between the air flows from the first and second air outlet channels 12 and 14 and the air flow from the fourth air outlet channel 18.

In the illustrated embodiment, ventilation nozzle 10 also includes a fourth air outlet channel 18 that is configured to provide a down draft as compared to first air outlet channel 12, second air outlet channel 14, and third air outlet channel 16. In a particular embodiment, and as illustrated, the fourth air outlet channel 18 is smaller in size than the first air outlet channel 12 and the second air outlet channel 14. In operation, the combination of the air outlet channels 12, 14, 16, and 18 serves to reduce an air draft that is generally noticeable at the center seats of a passenger aircraft.

Figure 5:
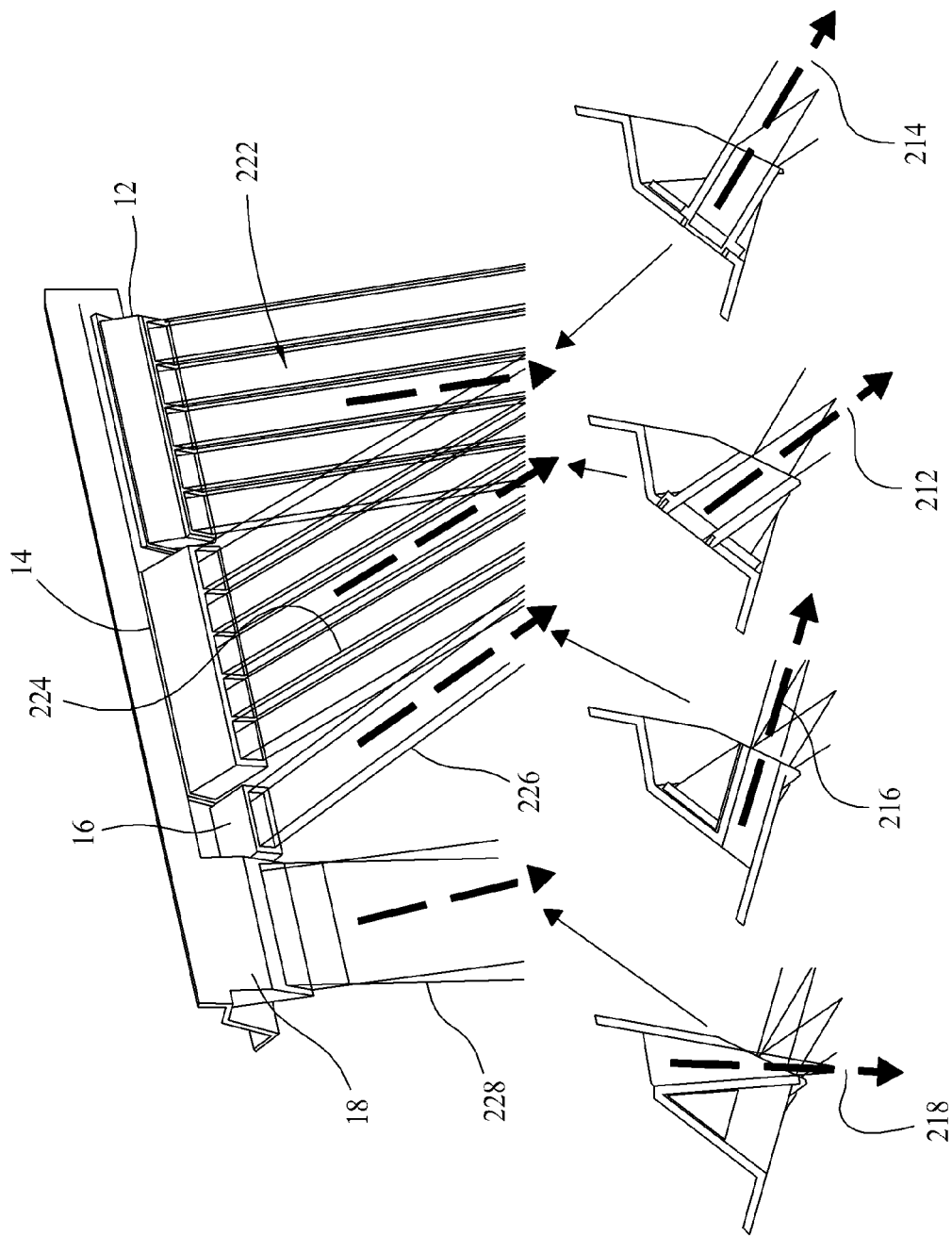
FIG. 5 is an illustration of the multiple air outlet ventilation nozzle of FIG. 1, including an indication of a flow direction for each individual air outlet channel.

As described further herein, the first air outlet channel 12 and the second air outlet channel 14 are configured such that an air flow from each is different in both an axial and in a vertical direction with respect to a vehicle centerline. The air flow from the first air outlet channel 12 and the air flow from the second air outlet channel 14 create two air jet layers that tend to slide over one another near the nozzle outlet (as shown in FIG. 5). As briefly mentioned above, air flow from the third air outlet channel 16 provides a buffer zone that reduces any impact that the air flow from the fourth air outlet channel 18 might have on the air flow direction of the air flows from the first air outlet channel 12 and the second air outlet channel 14. The air flow from the third air outlet channel 16 therefore also provides a buffer zone that reduces any impact that the air flow from the first air outlet channel 12 and the second air outlet channel 14 might have on the air flow direction of the air flows from the fourth air outlet channel 18. Generally, the third air outlet channel 16 has an axial and vertical orientation such that an air flow therefrom operates to reduce the influence that an air flow from the fourth air outlet channel 18 has on the air flows emanating from the first air outlet channel 12 and the second air outlet channel 14 and vice-versa.

Generally, the relatively downward direction of the air flow from the fourth air outlet channel 18 lowers the general air flow from ventilation nozzle 10 and enhances an air flow turbulence which results in a higher air flow velocity at the aisle of the passenger cabin.

The first air outlet channel 12 and the second air outlet channel 14 are both configured with a number of partitions 20 formed therein which serves to give the air flow from each an axial direction. In one specific embodiment, these partitions are formed at an angle with respect to a front surface 30 and overall opening 32 of the respective channels 12 and 14. In other words, the partitions 20 are generally not normal to the opening 32 associated with the front surface 30. The partitions 20 provide a baffling function for the first air outlet channel 12 and the second air outlet channel 14. Third air outlet channel 16 includes a front surface 34 and opening 36 and fourth air outlet channel 18 includes a front surface 38 and opening 40.

As described further herein, due to the multiple directional momentum jets of the outlet channels acting against one another down stream of the nozzle outlets, the configuration of ventilation nozzle 10 provides several advantages over current nozzle configurations, which are generally two-dimensional. Specifically, there is a shorter distance, from the nozzle outlet, to diffuse the air flow before reaching the cabin occupants, there is better air mixing inside the cabin, and the nozzle has a smaller outlet area. As described elsewhere herein, in one passenger vehicle application, each ventilation nozzle 10 opens to the passenger cabin through a single slot with about a 0.1" depth to about a 0.25" depth and has a face area along the nozzle 10 that ranges between about 0.5" to about 0.7" in height.

Figure 2:
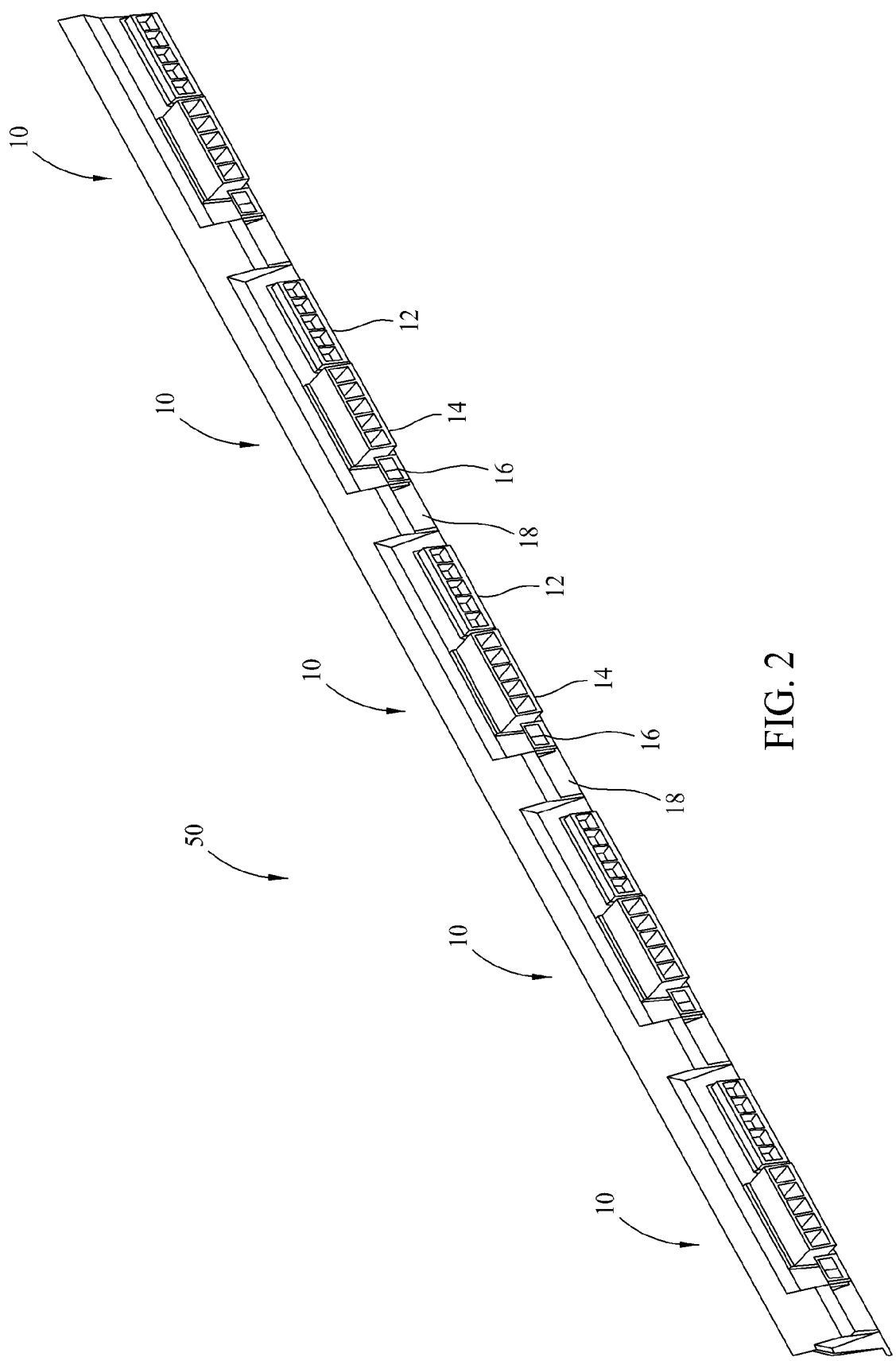
FIG. 2 is an illustration of the front of a ventilation nozzle assembly that includes a plurality of the multiple air outlet ventilation nozzles of FIG. 1.

FIG. 2 is an illustration of the front of a ventilation nozzle assembly 50 that includes a plurality of the multiple air outlet ventilation nozzles 10 of FIG. 1. A configuration such as illustrated by assembly 50 is considered to be especially useful for the ventilation of larger passenger vehicles including, but not limited to, aircraft, buses, and passenger trains. There is a three-dimensional air flow at the outlet of each of the channels of nozzle 10. As each nozzle 10 includes the described multiple series of air outlet channels, with vertical and axial alternate direction, a three dimensional orientation of air flow is provided at the outlet of each nozzle 10. To provide a varying length for nozzle assembly 50, multiple series of ventilation nozzles 10 can be included, as is represented by FIG. 2.

Figure 3:
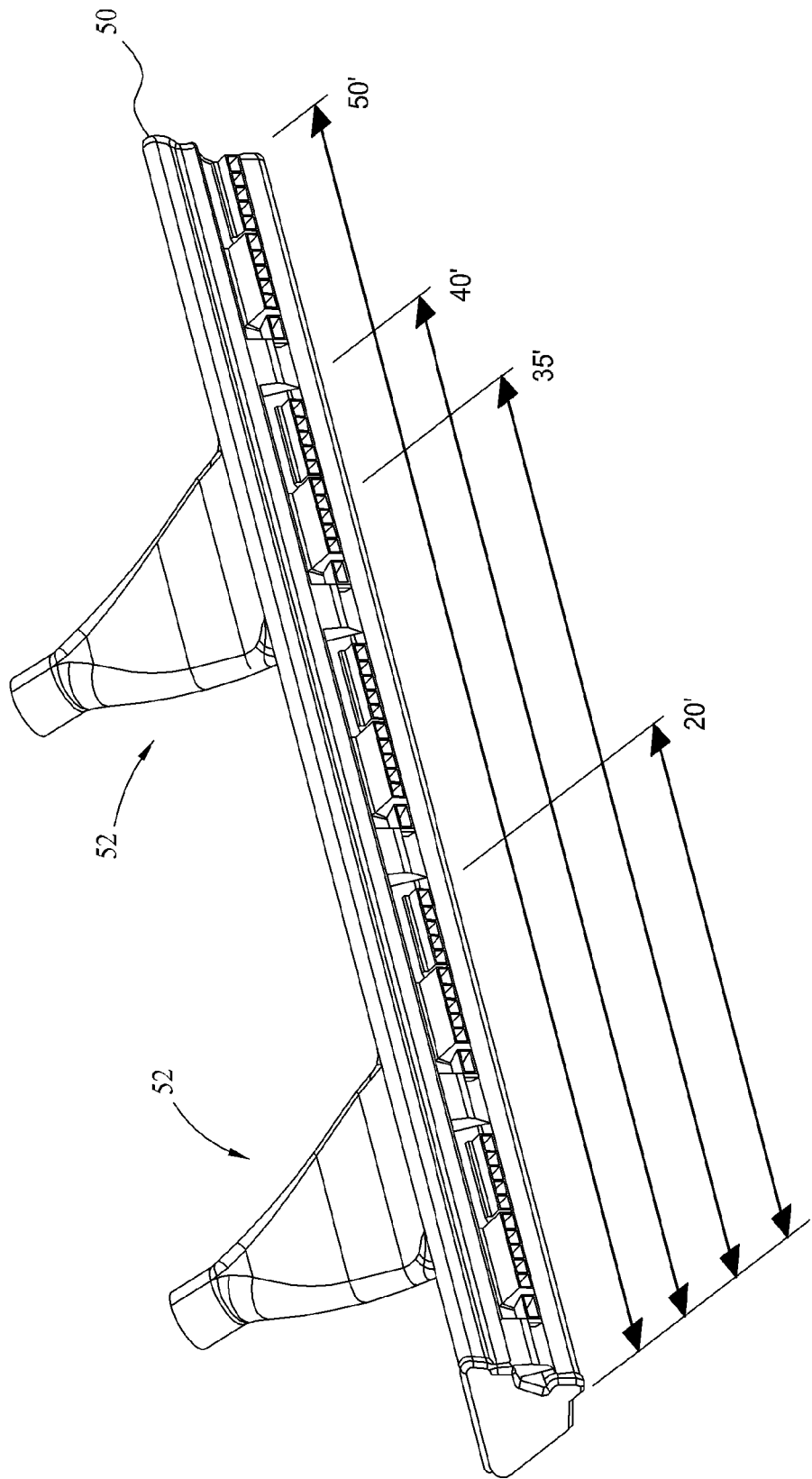
FIG. 3 is an illustration of a ventilation nozzle assembly that utilizes the multiple air outlet ventilation nozzle configuration of FIG. 2.

FIG. 3 is a schematic illustration of ventilation nozzle assembly 50. Consistent with FIG. 2, the nozzle assembly 50 includes multiple air outlet ventilation nozzles 10. As illustrated, assembly 50 also includes one or more plenums 52 that direct an air flow from an air flow source to the nozzle system described herein. In various particular embodiments of varying nozzle assembly length, a different number of plenums are utilized. For example, in the configuration of FIG. 3, for a 20 inch wide nozzle assembly 50, only one plenum 52 is needed, where two plenums 52 are utilized for nozzle assembly widths between 35 inches and 50 inches. In a passenger cabin, multiple assemblies 50 are contemplated, having widths, and corresponding numbers of plenums 52 as are needed to provide for passenger comfort. Multiple nozzle assembly lengths are constructed by changing the number of ventilations nozzles 10 in series. In one scenario, nozzle assemblies 50 are utilized in a space between the ceiling of the passenger cabin and an overhead storage bin. In this scenario, for both functional and aesthetic reasons, the nozzle assemblies 50 have a width that is substantially similar to the over head bin.

The nozzle assembly 50 of FIG. 3 illustrates that the assembly 50 includes a series of air outlet channels each having four individual channels that differ in vertical and axial orientation with respect to a centerline of a passenger cabin. As further described, a depth of these individual channels along the air flow direction is less than one inch. In contemplated applications, a width associated with each individual channel of nozzle 10 (shown in FIG. 1) ranges between half an inch and six inches.

Figure 4:
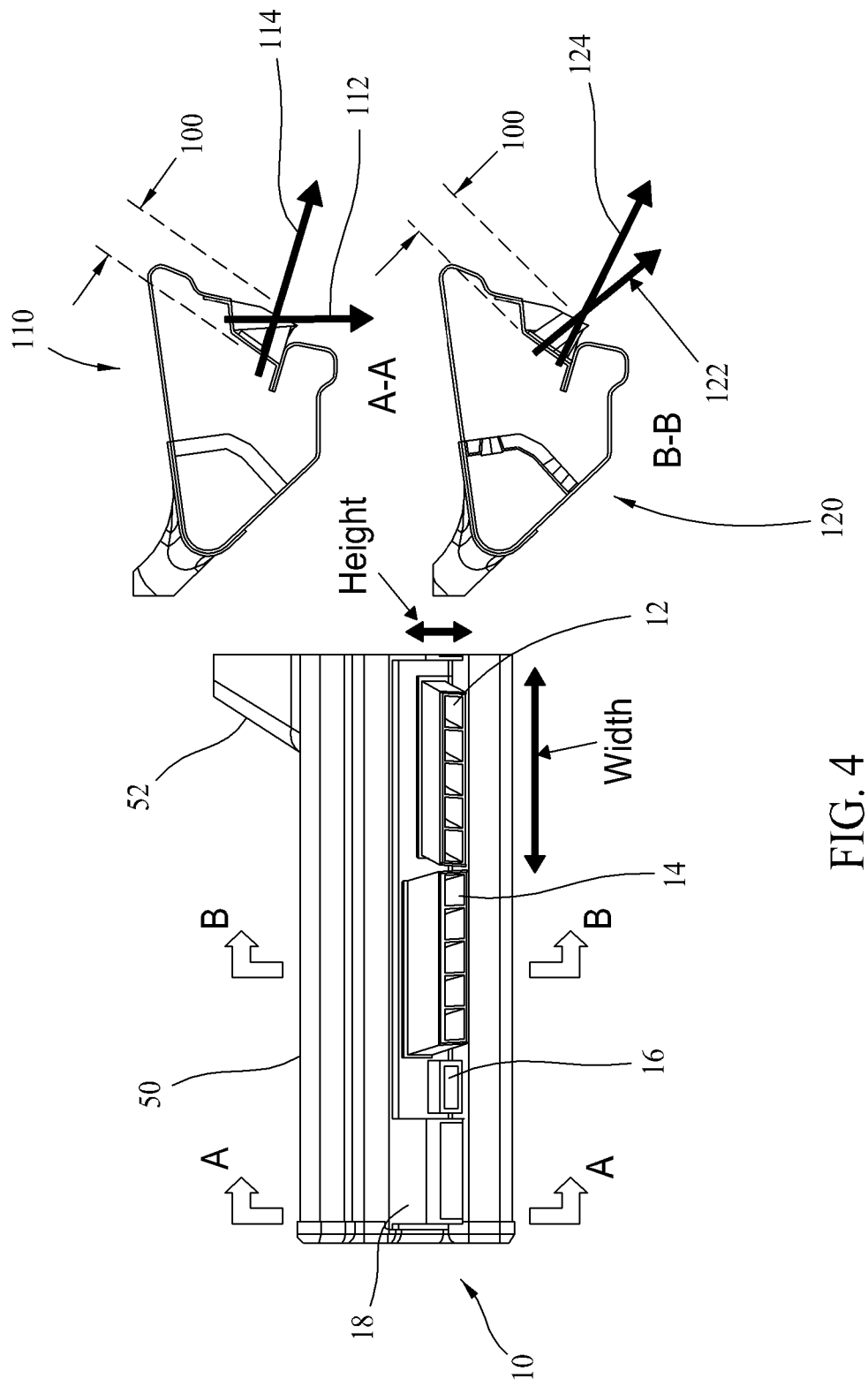
FIG. 4 is a diagram illustrating several cross-sectional views of the multiple air outlet ventilation nozzle of FIG. 1, including indicators of a flow direction.

FIG. 4 is a diagram illustrating several cross-sectional views of the multiple air outlet ventilation nozzle 10 of FIG. 1, including indicators of a flow direction. In one embodiment, a depth 100 of the individual channels associated with air outlet ventilation nozzle 10, along the air flow direction, is less than one inch. While presented in terms of size for one specific application, the depth of the individual channels is generally related to a size of the opening associated with the individual air outlet channels.

In the cross-sectional view A-A 110 of the nozzle assembly 50, an air flow direction 112 is shown for the fourth air outlet channel 18 as is an air flow direction 114 for the third air outlet channel 16. In the cross-sectional view B-B 120 of the nozzle assembly 50, an air flow direction 122 is shown for the second air outlet channel 14 as is an air flow direction 124 for the first air outlet channel 12. The cross-sectional views 110 and 120 illustrate the different vertical orientations of one embodiment of the air outlet channels 12, 14, 16, and 18.

FIG. 5 is an illustration of the multiple air outlet ventilation nozzle 10 of FIG. 1, including indications of flow direction with respect to vertical and a cross-sectional view for each individual air outlet channel. Specifically, FIG. 5 illustrates a flow direction from each of the air outlet channels 12, 14, 16, and 18. A cross-sectional view of each of the air outlet channels is included in FIG. 5 illustrating the vertical direction of the air provided therethrough. For the first air outlet channel 12, the air flow direction 212 is shown in the cross-sectional view. For the second air outlet channel 14, the air flow direction 214 is shown in the cross-sectional view. For the third air outlet channel 16, the air flow direction 216 is shown in the cross-sectional view. For the fourth air outlet channel 18, the air flow direction 218 is shown in the cross-sectional view.

The nozzle assembly 50 described herein consists of multiple series of short channels (e.g., the individual air outlet channels of ventilation nozzle 10), that each provide a separate air flow that is oriented in alternate directions both vertically and axially. Stated differently, each air outlet channel of the ventilation nozzle 10 provides a discrete, directional momentum air jet with an alternate orientation. For example, referring to first air outlet channel 12 which provides a plurality of air jets 222 that substantially slides over air jets 224 from second air outlet channel 14 as depicted in FIG. 5. The behavior of the air jet 226 from the third air outlet channel 16 acts as a buffer zone to separate jets 222 and 224 from the jet 228 that originates from the fourth air outlet channel 18. The interaction of jets 222, 224, 226, and 228 results in a rapid diffusion of the overall momentum of the air jets, resulting in a lower air velocity at the seated passenger level as compared to known ventilation nozzle configurations. Additionally, the configuration of air jets 222, 224, 226, and 228 promotes air turbulence inside the cabin, resulting in improved air mixing and a more uniform cabin temperature.

The above described embodiments solve the problem of providing adequate ventilation air within a passenger vehicle cabin such that the air is delivered to the seating area at low velocity, to the standing area relatively higher velocity, and reducing overall temperature stratification within the cabin. The ventilation nozzle 10 which is a part of a nozzle assembly 50 directs a plurality of air streams such that one air stream is directed generally downward and the momentum of at least one other air stream is diffused by a third air stream. As described herein, the assembly 50 is necessarily small in size, for example, to conform to aircraft interior design requirements. The use of the three dimensional, alternate directional momentum, ventilation nozzle 10 as part of a nozzle assembly 50 contributes to the overall passenger cabin comfort experience.

While the invention has been described in terms of various specific embodiments, those skilled in the art will recognize that the invention can be practiced with modification within the spirit and scope of the claims.

What is claimed is:

1. A ventilation nozzle assembly comprising:
a first fixed air outlet channel configured to provide an air flow in a first direction;
a second fixed air outlet channel next to said first air outlet channel and configured to provide an air flow in a second direction such that the airflow in the second direction immediately slides over the air flow in the first direction;
a third fixed air outlet channel next to said second air outlet channel and configured to provide an air flow in a third direction; and
a fourth fixed air outlet channel next to said third air outlet channel and configured to provide an air flow in a fourth direction, an air flow from said third air outlet channel configured to reduce an impact of the air flow from said fourth air outlet channel has on the air flows from said first air outlet channel and said second air outlet channel, wherein said first air outlet channel, said second air outlet channel, said third outlet channel, and said fourth outlet channel are each configured such that air flows therethrough are different in a vertical direction and different in an axial direction with respect to a vehicle centerline, an outlet of said third air outlet having a cross section area perpendicular to the airflow smaller than an air outlet with a cross section area perpendicular to the airflow of each of said first, second, and fourth outlet channels, and wherein said first, second, third, and fourth outlet channels are aligned in a series.

2. A ventilation nozzle assembly according to claim 1 wherein said fourth air outlet channel is configured to provide a down draft as compared to said first air outlet channel, said second air outlet channel, and said third air outlet channel.

3. A ventilation nozzle assembly according to claim 2 wherein said outlet of having a cross section area perpendicular to the airflow smaller in area than a cross section area perpendicular to the airflow of said outlet of each of said first air outlet channel and said second air outlet channel.

4. A ventilation nozzle assembly according to claim 1 wherein said first air outlet channel and said second air outlet channel comprise partitions therein, said partitions configured to direct an air flow from a respective said air outlet channel in a specific axial direction.

5. A ventilation nozzle assembly according to claim 2 comprising a multiple series of said first air outlet channels, said second air outlet channels, said third air outlet channels, and said fourth air outlet channels.

6. A ventilation nozzle assembly according to claim 5 wherein said multiple series of said air outlet channels is substantially similar in width to an overhead cargo bin of a passenger vehicle.

7. A ventilation nozzle assembly according to claim 5 wherein said multiple series of said air outlet channels comprises a repeating pattern that is independent of a seating arrangement within a cabin of a passenger vehicle.

8. A ventilation nozzle assembly according to claim 5 comprising at least one plenum for providing supply air to said series of air outlet channels.

9. A ventilation nozzle assembly according to claim 1 wherein an overall air flow from said ventilation nozzle is diffused before reaching seating areas of a passenger vehicle.

10. A ventilation nozzle assembly according to claim 1 further comprising a fourth air outlet channel adjacent said third air outlet channel and configured to provide a down draft as compared to said first air outlet channel, said second air outlet channel, and said third air outlet channel, and wherein said first air outlet channel, said second air outlet channel, said third air outlet channel, and said fourth air outlet channel configured with respective depths that are related to a size of an opening in the front surface of the corresponding air outlet channel.

11. A ventilation nozzle comprising:
a fixed first air outlet channel, said first air outlet channel configured to provide an air flow in a first direction;
a fixed second air outlet channel, said second air outlet channel next to said first air outlet channel and configured to provide an air flow in a second direction;
a fixed third air outlet channel, said third air outlet channel next to said second air outlet channel and configured to provide an air flow in a third direction; and
a fixed fourth air outlet channel, said fourth air outlet channel next to said third air outlet channel, wherein the third air outlet channel has an axial and vertical orientation such that an air flow therefrom operates to reduce an influence the air flow from the fourth air outlet has on airflows from said first outlet channel and said second outlet channel, wherein said first air outlet channel, said second air outlet channel, said third outlet channel, and said fourth outlet channel are each configured such that air flows therethrough are different in a vertical direction and different in an axial direction with respect to a vehicle centerline, an outlet of said third air outlet having a cross section area perpendicular to the airflow smaller than an air outlet with a cross section area perpendicular to the airflow of each of said first, second, and fourth outlet channels, and wherein said first, second, third, and fourth outlet channels are aligned in a series.

12. A ventilation nozzle according to claim 11 wherein said first, second, third, and fourth air outlet channels are configured such that a combined air flow therefrom has a three dimensional turbulence so that drafts are diffused in any one direction.

13. A ventilation nozzle according to claim 11:
   wherein the air flow from said third air outlet channel is configured to separate the air flow from said fourth air outlet channel from the air flows from said first air outlet channel and said second air outlet channel.

14. A ventilation nozzle according to claim 13 wherein said fourth air outlet channel is configured to provide a downward air flow with respect to a vehicle centerline as compared to said first air outlet channel, said second air outlet channel, and said third air outlet channel.

15. A ventilation nozzle according to claim 13 wherein said first air outlet channel and said second air outlet channel comprise partitions therein, said partitions configured to direct an air flow from a respective said air outlet channel in a specific axial direction.

* * * * *

UNITED STATES PATENT AND TRADEMARK OFFICE
CERTIFICATE OF CORRECTION

PATENT NO. : 9,561,855 B2  Page 1 of 1
APPLICATION NO. : 12/113450
DATED : February 7, 2017
INVENTOR(S) : Al-Alusi et al.

It is certified that error appears in the above-identified patent and that said Letters Patent is hereby corrected as shown below:

In the Claims

In Column 6, Line 13, Claim 3, delete "outlet of having a cross section" and insert therefor -- outlet of said fourth air outlet channel having a cross section --.

In Column 6, Line 52, Claim 11, delete "a fixed first air" and insert therefor -- a first fixed air --.

In Column 6, Line 54, Claim 11, delete "a fixed second air" and insert therefor -- a second fixed air --.

In Column 6, Line 57, Claim 11, delete "a fixed third air" and insert therefor -- a third fixed air --.

In Column 6, Line 60, Claim 11, delete "a fixed fourth air" and insert therefor -- a fourth fixed air --.

Signed and Sealed this
First Day of August, 2017

Joseph Matal
*Performing the Functions and Duties of the
Under Secretary of Commerce for Intellectual Property and
Director of the United States Patent and Trademark Office*